Jan. 30, 1940.   S. BUCKLEY   2,188,766
BRAKE MECHANISM
Filed Oct. 19, 1938
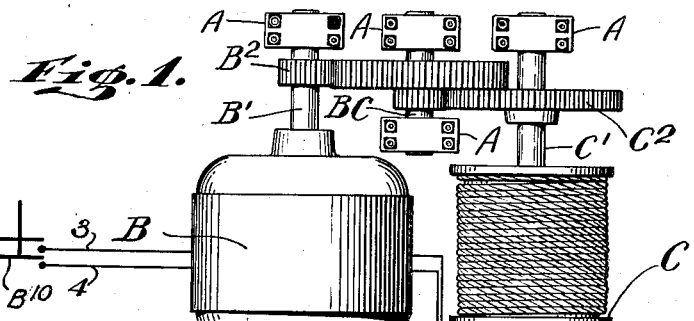
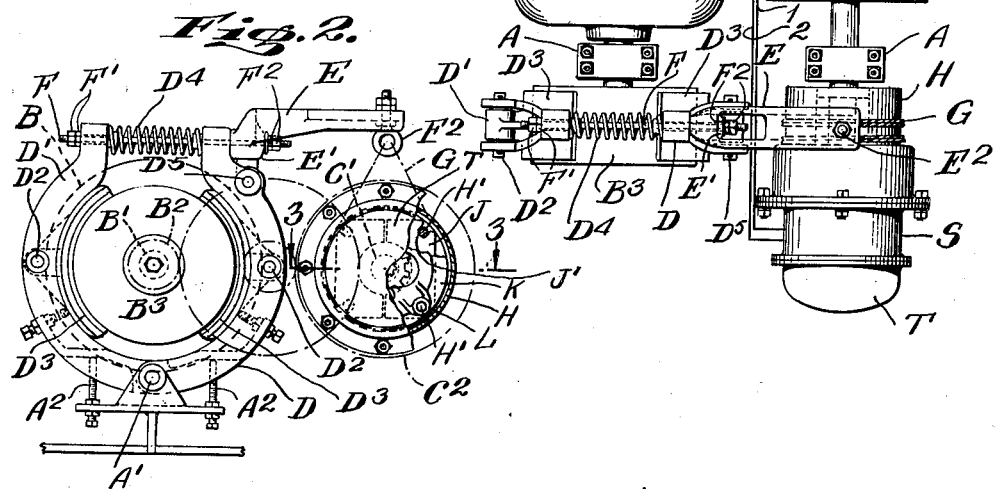
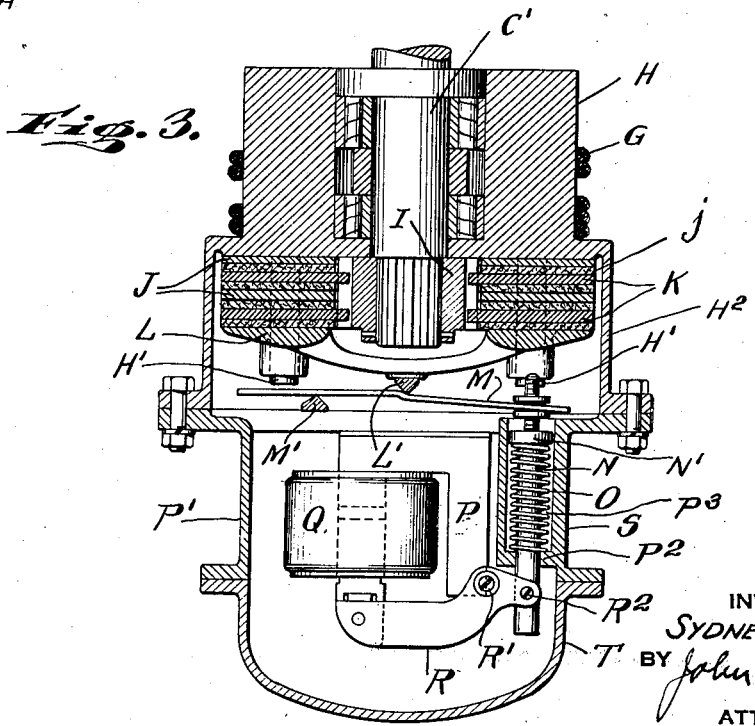
INVENTOR
SYDNEY BUCKLEY
BY John E. Hubbell
ATTORNEY Patented Jan. 30, 1940

2,188,766

UNITED STATES PATENT OFFICE 2,188,766

BRAKE MECHANISM

Sydney Buckley, Philadelphia, Pa., assignor to Shepard Niles Crane & Hoist Corporation, Montour Falls, N. Y., a corporation of New York Application October 19, 1938, Serial No. 235,714

7 Claims. (Cl. 188—137)

The primary object of the present invention is to provide an improved electric brake mechanism, primarily devised for use in an electric crane or hoist, to arrest and prevent movement of the hoisting drum, or the like when the electric motor employed to rotate the drum is deenergized.

It has long been standard practice to provide a hoist mechanism unit including an electric driving motor, with a brake mechanism comprising a spring or weight tending at all times to establish and maintain a braking force, and also comprising a solenoid or other electromagnetic means which neutralizes the braking tendency of the spring or weight when, and only when the driving motor is energized. Such a brake mechanism has the desirable characteristic that it automatically applies the braking force when the driving motor is deenergized, either intentionally to arrest operation of the hoisting mechanism, or accidentally, as on a failure in the electrical current supply. It also has the further characteristic, highly undesirable in some cases, that the magnitude of the braking force does not vary automatically with the weight of the load, and the braking action is highly positive, at least when the weight of the load handled is less than the maximum which the hoisting mechanism is arranged to handle.

The present invention has for its specific object, the provision of a simple and effective brake mechanism, adapted for hoisting mechanism use, and having the above mentioned desirable characteristic of the standard braking mechanism now in use, but which is unlike the latter, in that its braking force is directly due to movement of the hoisting mechanism, and progressively increases from the instant at which the hoisting motor is deenergized until it attains whatever magnitude is needed to interrupt such movement. The use of the present invention thus avoids the shock and strain on the hoisting mechanism, due to the unduly positive braking action, necessarily resulting from the application of the full braking force instantly on the deenergization of the driving motor, and especially objectionable in the operation of extra heavy, quick operating hoist mechanisms.

The operating advantage of the progressively increasing braking effect of the improved braking mechanism, over the positive, "on and off" braking force action of the braking mechanisms now in general use, is augmented by the fact that in practice, hoisting mechanism brakes are not readjusted frequently and accurately enough to make their operation practically independent of brake shoe wear. With the prior braking mechanisms, brake shoe wear without a corresponding readjustment of the braking apparatus increases the required braking force, while with the improved braking mechanism, it results merely in slightly increasing the hoisting mechanism movement required to establish a given braking force.

Hoisting mechanism units of the kind for use in which the present invention was primarily devised, each comprise a motor shaft and a separate hoisting drum shaft driven by the motor shaft through a speed reducing gearing, which usually includes an intermediate shaft revolving at a speed intermediate the motor and hoisting drum shaft speeds. In its preferred form, my improved braking mechanism comprises a braking wheel or drum carried by one shaft of the hoisting unit, and means including an actuating member, which is clutch connected to a second shaft of the unit, when, and only when, the driving motor of the unit is deenergized and is then actuated by movement of said second shaft to press braking shoes against the braking surface of the braking wheel or drum, with the pressure required to establish the required braking force after overbalancing the action of a bias spring or weight tending to hold the brake shoes out of operative engagement with the brake surface. In a preferred practical form of the invention, the second shaft is the hoisting drum shaft, or an intermediate shaft operating at a lower speed than the shaft, usually the motor shaft, carrying the braking wheel or drum.

My improved braking mechanism in its preferred form, is characterized by the fact that it may consist mainly of brake, friction clutch and solenoid mechanism parts of standard commercial type and form.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a diagrammatic plan view of a hoisting mechanism;

Fig. 2 is an end elevation of the mechanism shown in Fig. 1;

Fig. 3 is an enlarged horizontal section on the line 3—3 of Fig. 2.

In the accompanying drawing I have illustrated the use of the present invention in a simple form of hoisting mechanism, comprising supporting bearings A, for the shaft B' of a hoist motor B, and for the shaft C' of a hoist drum C, and for an intermediate shaft BC. The drum C is rotated by the motor B through speed reducing gearing which, in the simple form shown in Fig. 1, comprises an intermediate shaft BC, and a relatively large gear and a relatively small gear secured thereto, said gears being respectively in mesh with a relatively small gear $B^2$, carried by the shaft B', and with a relatively large gear $C^2$, carried by the shaft C'.

As shown, a brake drum or wheel $B^3$ is secured to the motor shaft B', and curved brake levers D and D' extending upwardly at opposite sides of the drums are pivotally connected to and supported by a pivot pin or shaft A', located directly beneath the shaft B'. Each lever is provided, intermediate its ends, with a pivotal support $D^2$ for a corresponding brake shoe $D^3$. The upper ends of the levers D and D' are shown as substantially parallel to the plane including the axes of the shaft B' and the pivot A'. A bias spring $D^4$ acting between the upper ends of the levers D and D', tends to force each away from the other, and thereby holds the brake shoes $D^3$ out of operative engagement with the brake drum $B^3$. The extent to which each lever D and D' and the corresponding brake shoe $D^3$ is permitted to move away from the brake drum, is limited by a corresponding adjustable stop $A^2$ carried by the hoist support.

The upper ends of the brake levers D and D' are moved toward one another, against the action of the spring $D^4$, to force the brake shoes $D^3$ into gripping relation with brake drum $B^3$, by an adjustment of a lever E in the clockwise direction, as seen in Fig. 2. The lever E is pivoted at $D^5$ to the brake lever D, adjacent the upper end of the latter but somewhat below the axis of the spring $D^4$. The lever E comprises an uprising portion adjacent the pivot $D^5$, formed with an aperture loosely receiving a bolt or tie member F, which passes axially through the spring $D^4$, and extends through passages formed in the upper ends of levers D and D'. The bolt F has nuts F' threaded on it at one end to form an abutment engaging the arm D' at the opposite side of the latter from the spring $D^4$, and has nuts $F^2$ threaded on its other end to form an abutment engaged by a bearing surface E' on the uprising portion of the lever E, which extends between the last mentioned abutment and the upper end of the brake lever D.

As shown, the lever E is bent and comprises a horizontally displaced portion which extends over the hoist shaft C', and is connected by means, shown as an eye bolt $E^2$, to the ends of a cable or other flexible element G, having its body portion helically wound around a drum member H, coaxial with the hoist shaft C'. The drum H is normally stationary, but on the deenergization of the motor B, the drum H is clutch connected to the shaft C', and is thereby given an angular adjustment, which while comparatively small, is sufficient to exert enough pull on the lever E through one end or the other of the cable G, depending on the direction of rotation of the shaft C', to apply whatever braking force to drum $B^3$ is required to arrest the motion of the motor and hoist shafts.

The clutch means shown for thus clutching the drum H to the shaft C' is an electromagnetic friction clutch or brake of known type, comprising a hub I keyed on the shaft C', a series of clutch wheels K surrounding and splined on the hub I, and a series of pairs of clutch plates J. Each plate J extends half about the hub I, and the two plates of each pair surround the hub and alternate along the length of the latter with wheels K, and are splined on the drum H, by means parallel to the shaft C', and passing through notches J' formed in the outer edges of the plates J. The parts J and K may be in direct frictional engagement, but as shown parts $j$ shaped like the parts J are formed of brake lining material or the like interposed between the parts J and K to obtain greater friction. An annular member L, acting on the outer or lower end, as seen in Fig. 3 of the mass of wheels K and discs J and $j$, is adapted to compress said mass and thereby create the required frictional resistance to angular movement of the wheels K relative to the discs J.

The member L is actuated in the clutching direction by a bias spring O, acting through a spring bolt N, on a lever M. The latter has a fulcrum support M' rigidly connected to the drum H, and intermediate its ends, the lever engages a pivot projection L' of the member L, coaxial with the shaft C'. When the motor B is energized, the spring O is prevented from operating on the clutch mechanism by an electromagnet P, comprising a winding Q and an armature R. The armature includes a portion axially movable in the winding Q, and is pivotally connected at R' to the stationary electromagnet core between the axis of the winding Q and the bolt N, to which the armature R is pivotally connected at $R^2$.

The friction clutch parts proper, are located in a cylindrical extension $H^2$ of the member H, and the electromagnet is mounted within and enclosed by a casing element P', which is detachably connected to the extension $H^2$, and is formed with a guide passage $P^3$ for, and through which, the bolt N extends, and has an apertured wall $P^2$ at the lower end of said passage and forming an abutment against which one end of the spring O bears. The opposite end of that spring bears against a movable abutment in the form of a collar N' carried by bolt N. As diagrammatically shown, the winding Q is energized through conductors 1 and 2, when the motor B is energized by current supplied by conductors 3 and 4, on the closure of the switch $B^{10}$.

The general operation of the apparatus shown in the drawing will be apparent to those skilled in the art from the drawing and the foregoing description. When the motor B and winding Q are energized, the lever M does not tend to operatively compress the cylindrical mass including the parts J, $j$ and K, and the rotation of shaft C' does not subject the brake actuating member H to significant torque as the shaft C' rotates. The compression spring $D^4$ then forces brake levers D and D' apart, so that the brake shoes $D^3$ are out of operative engagement with the brake drum $B^3$, and the lever E acts through the cable G to hold the actuating member H in an intermediate position in which neither of the two portions of the cable extending from the member H to the eye bolt $F^2$, is under significant tension.

When the motor B is deenergized, the simultaneous deenergization of the winding Q, permits the bias spring O, acting through the bolt N, lever M and member L, to compress the cylindrical mass of clutch parts J, j and K together, and thereby clutch the brake actuating member H to the shaft C'. The rotation of the shaft C' in either direction will subject the lever E to a pull through one or the other of the two operative connections formed by the two ends of the cable G, and thereby turn the lever E clockwise about its pivotal fulcrum connection D⁵ with the brake lever D. Such turning movement of the lever E operates through the member F and its abutment nuts F' and F² to move the upper ends of the levers D' and D together, against the action of the spring D⁴, and thereby press the brake shoes D³ against the brake drum B³ to create an effective braking force. As the turning movement of the lever E progresses, the braking force thus applied to the armature shaft B' of the motor B, increases until it is sufficient to arrest the motion of the shaft B' and thereby of the hoisting drum C.

As will be apparent, the braking force applied in the manner just described, progressively increases from its zero value, at the instant at which the end Q is deenergized, to the maximum required to hold the hoisting drum stationary, no matter how much the load suspended from the drum may weigh. Notwithstanding the fact that the friction clutch mechanism may be positive in its action, so that there is no relative movement between the switch actuating member D and the shaft C' after the deenergization of the coil Q, the gradual increase in the braking force during the small angular movement permitted the shaft C' and member H, makes the shock and stress in the hoisting mechanism much smaller than would result from the instant application of the full braking force.

The mounting of the brake actuating member H on a relatively low speed shaft of the hoisting mechanism permits of a greater angular movement of the hoisting drum following the deenergization of the winding Q before the necessary braking force is established than would occur, other things being equal, if the member H were mounted on a relatively high speed shaft of the mechanism. The location of the member H on a relatively low speed shaft thus tends of itself, to a reduction in the strain or shock due to interruption in the movement of the hoisting mechanism. The considerable leverage with which the member H acts through lever part E, also contributes to increased graduation in the application of the braking force.

The amount of angular movement permitted the shaft on which the clutch is mounted, following the deenergization of the motor, may be desirably increased, in some cases, by designing and adjusting the clutch mechanism, so that under the load and operating conditions in which a sudden interruption in the hoist movement would subject the hoist mechanism to a specially heavy shock or stress, some slippage of the friction wheels K relative to the discs J may occur. In the operation of an ordinary hoisting mechanism, it is especially important, of course, that the brake operate to prevent down travel of the load when the hoist motor is deenergized, but even in the operation of such hoists, as well as in the operation of other apparatus with which the invention may be employed with advantage, inertia effects make it desirable that the brake actuator should begin to apply the braking force instantly on the deenergization of the motor, regardless of the directions of rotation of the drum or hoist motor at the time.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A mechanism of the kind described comprising a driving motor and two laterally displaced shafts connected for simultaneous rotative movements, and braking means comprising a braking surface supported by and rotating with one of said shafts, and means for applying a braking force thereto including a lever pivoted to turn about an axis parallel to said shafts, means actuated by one end of said lever to frictionally engage said surface when said lever is turned about said axis, an actuating member coaxial with the second of said shafts and operatively connected to the second end of said lever, and means actuated by the deenergization and energization of said motor to connect said second shaft and member for simultaneous rotative movements when said motor is deenergized and to disconnect said second shaft and member when said motor is energized.

2. A mechanism of the kind described, comprising a driving motor and two shafts connected for simultaneous rotative movements at different speeds, and braking means comprising a braking surface supported by and rotating with the shaft rotating at the higher speed, and means for applying a braking force thereto including an actuating member coaxial with the second of said shafts, and means actuated by the deenergization and energization of said motor to connect said second shaft and member for simultaneous rotative movements when said motor is deenergized and to disconnect said second shaft and member when said motor is energized.

3. A mechanism of the kind described, comprising a driving motor and two laterally displaced shafts connected for simultaneous rotative movements, and braking means comprising a braking surface supported by and rotating with one of said shafts, and means for applying a braking force thereto including a lever pivoted to turn about an axis parallel to said shafts, means actuated by one end of said lever to frictionally engage said surface when said lever is turned about said axis, an actuating member coaxial with the second of said shafts and operatively connected to the second end of said lever, friction clutch means biased to connect said second shaft and member for simultaneous rotative movements, and means for rendering said clutch means inoperative when said motor is energized.

4. A mechanism of the kind described comprising a driving motor, two laterally displaced shafts connected for simultaneous rotative movements and braking means comprising a braking surface supported by rotating with one of said shafts, brake levers at opposite sides of said surface, an operating lever extending transversely of said shafts and operatively connected to both of said brake levers, and adapted when turned in one direction to effect relative movement of the brake levers and thereby subject said surface to a braking force, a brake actuating member coaxial with the second of said shafts, means actuated by the deenergization and energization of said motor to connect said second shaft and member for simultaneous rotative movements when said motor is deenergized and to disconnect said second shaft and member when said motor is energized and means connecting said operating lever and actuating member through which rotative movement of said member in either direction is adapted to turn said operating lever in said one direction.

5. A mechanism of the kind described comprising a driving motor, two laterally displaced shafts connected for simultaneous rotative movements and braking means comprising a braking surface supported by and rotating with one of said shafts, brake levers at opposite sides of said surface, an operating lever extending transversely of said shafts and having a pivotal fulcrum connection with one of said brake levers, an operative connection between the other of said brake levers and said operating lever whereby said operating lever when turned in one direction will effect relative movement of the brake levers and thereby subject said surface to a braking force, a brake actuating member coaxial with the second of said shafts, means actuated by the deenergization and energization of said motor to connect said second shaft and member for simultaneous rotative movements when said motor is deenergized and to disconnect said second shaft and member when said motor is energized and means connecting said operating lever and actuating member through which rotative movement of said member in either direction is adapted to turn said operating lever in said one direction.

6. A mechanism of the kind described comprising a driving motor, two laterally displaced shafts connected for simultaneous relative movements and braking means comprising a braking surface supported by and rotating with one of said shafts, an operating lever pivoted to turn about an axis parallel to said shaft and adapted when turned in one direction to effect the application of a braking force to said surface, a brake actuating member coaxial with the second of said shafts, means connecting said member and actuating lever through which rotative movement of said member in either direction turns said operating lever in said one direction, said second shaft and member having cooperating clutch surfaces, bias means tending to press said clutch surfaces together and thereby frictionally clutch said member to said second shaft, and means actuated by the energization of said motor to render said bias means inoperative.

7. A mechanism of the kind described comprising a driving motor, two laterally displaced shafts connected for simultaneous relative movements and braking means comprising a braking surface supported by and rotating with one of said shafts, an operating lever pivoted to turn about an axis parallel to said shaft and adapted when turned in one direction to effect the application of a braking force to said surface, a brake actuating member coaxial with the second of said shafts, means connecting said member and actuating lever through which rotative movement of said member in either direction turns said operating lever in said one direction, said second shaft and member having cooperating clutch surfaces, bias means tending to press said clutch surfaces together and thereby frictionally clutch said member to said second shaft, and means actuated by the energization of said motor to render said bias means inoperative, said last mentioned means and bias means being mounted on and supported by said member.

SYDNEY BUCKLEY.